Dec. 20, 1949  O. W. LIVINGSTON  2,491,822
MAXIMIZING OR MINIMIZING CONTROL SYSTEM
Filed July 26, 1947  2 Sheets-Sheet 1
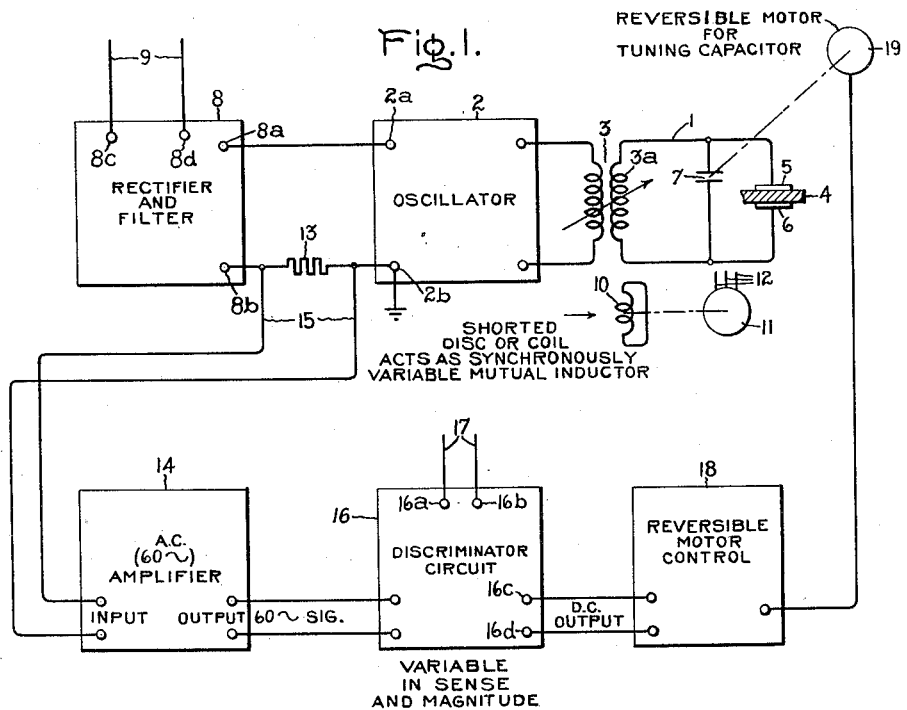
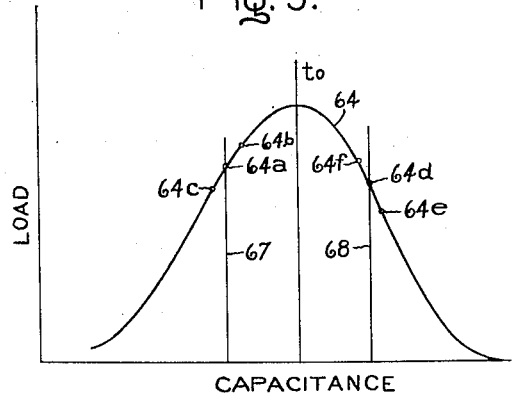
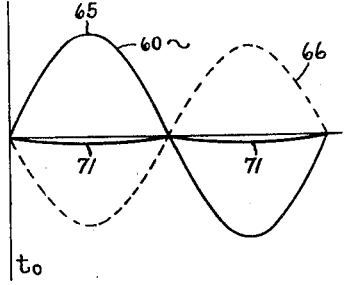
Inventor:
Orrin W. Livingston,
by Claude A. Mott.
His Attorney.

Dec. 20, 1949     O. W. LIVINGSTON     2,491,822
MAXIMIZING OR MINIMIZING CONTROL SYSTEM
Filed July 26, 1947     2 Sheets-Sheet 2

Inventor:
Orrin W. Livingston,
by Claude H. Nott
His Attorney.

Patented Dec. 20, 1949

2,491,822

UNITED STATES PATENT OFFICE 2,491,822

MAXIMIZING OR MINIMIZING CONTROL SYSTEM

Orrin W. Livingston, Scotia, N. Y., assignor to General Electric Company, a corporation of New York Application July 26, 1947, Serial No. 763,871

4 Claims. (Cl. 250—36)

1

This invention relates to control systems, more particularly to systems for maximizing or minimizing a variable quantity which has values that depend upon some independent variable, and which has a value at which its first derivative is zero or passes through zero. The invention has for an object the provision of a simple, reliable and improved control system of this character.

In carrying the invention into effect in one form thereof, a control system is provided for a translating device which has an independently variable property and a dependently variable quantity. Means are provided for effecting a relatively small amplitude periodic variation of the dependent variable which has the same periodicity as that of a periodically varying reference voltage. From the periodic variation of the dependently variable quantity there is derived a signal voltage of the same periodicity. If the dependent variable increases as the independent variable is increased, a predetermined phase relationship, e. g. the in-phase relationship, exists between the signal voltage and the reference voltage. This phase relationship is reversed if the dependent variable decreases as the independent variable is increased. An electric valve phase discriminator responds to the phase relationship of the signal voltage relative to the reference voltage and a reversible controlling means which is controlled by the phase discriminator varies the independently variable property of the translating device in a sense which corresponds to the phase of the signal voltage relative to the reference voltage.

In illustrating the invention in one form, it is shown as embodied in a system for controlling a high frequency heating equipment.

Figure 2:
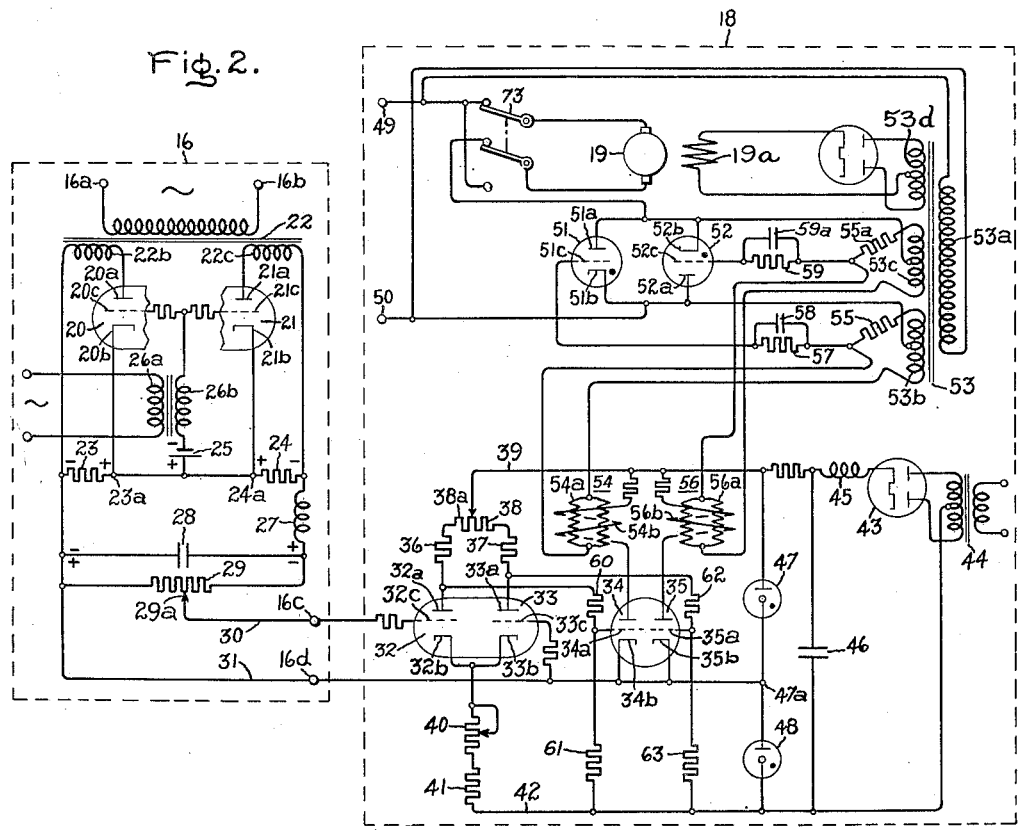

For a better and more complete understanding of the invention, reference should now be had to the following specification and to the accompanying drawings of which Fig. 1 is a simple block diagram of the invention, Fig. 2 is a simple, schematic diagram of an electronic control system which constitutes a portion of the control system embodying the invention; and Figs. 3, 4, 5 and 6 are charts of characteristic curves which serve to illustrate its operation.

Referring now to the drawing, high frequency electric power is supplied to a translating circuit 1 from a suitable source such as an electric valve oscillator 2 to which it is coupled by suitable coupling means such as the transformer 3. A heating load which is represented by a body 4 is mounted in close engagement between two heating plate electrodes 5 and 6 which are connected to opposite terminals of the secondary winding 3a of the transformer 3. A tuning capacitor 7 is connected in parallel with the heating load.

The oscillator 2 is preferably an electric valve type oscillator. It may be any of the oscillators which are available on the market. Since the invention is not concerned with the details of the oscillator, it is illustrated conventionally in the drawing. Its input terminals 2a and 2b are supplied from the output terminals 8a and 8b of a rectifier 8 of which the input terminals 8c and 8d are connnected to a suitable source of alternating voltage supply such as is represented by two supply conductors 9. It is preferably of the electric valve type, such as a thyratron or ignitron rectifier and is provided with a suitable filter for removing the ripple from the rectified voltage.

For the purpose of producing a periodically varying signal voltage which is indicative of whether the direct current supplied to the oscillator is increasing or decreasing, suitable means are provided for varying the inductance of the secondary circuit of the coupling transformer 3 so that the reactance is varied approximately sinusoidally at a 60 cycle frequency. This means is illustrated as a short circuited disk or coil 10 driven by a synchronous motor 11. The synchronous motor is supplied from a suitable source of alternating voltage which is represented by the three supply conductors 12. As indicated in the block diagram of Fig. 1, the short circuited coil 10 is mounted in inductive relationship with the secondary winding 3a of the coupling transformer, and since it is rotated at a synchronous speed, it acts as a synchronously variable mutual inductor. Ordinarily, with a 60 cycle supply, the short circuited turn would be rotated at 1800 R. P. M. since the inductance varies from minimum to maximum and from maximum back to minimum twice each revolution. Alternatively, the synchronous motor 11 might drive a small variable capacitor in parallel with the main secondary capacitor 7 to vary the tuning of the secondary circuit at a 60 cycle rate.

If the output circuit is not at resonance but is on the low capacity side of the resonance peak of the curve which represents the power in the translating circuit, the rotation of the short circuited coil at synchronous speed causes the tuning of the heating load circuit to be varied toward and away from resonance at a synchronous speed corresponding to the frequency of the source 12 which is assumed to be 60 cycle. This gives rise to a 60 cycle variation of current in the input to the power oscillator 2 which produces a similar 60 cycle voltage drop across a resistor 13 which is connected in series relationship in the supply conductor between an output terminal of the rectifier and an input terminal of the oscillator. The periodically varying voltage drop across the resistor 13 is referred to in the following specification as the signal voltage.

This signal voltage is supplied to an A.-C. amplifier 14 to the input terminals of which the resistor 13 is connected by means of conductors 15. Form the output terminals of the amplifier the amplified signal voltage is supplied to a phase discriminator unit 16. This phase discriminator unit compares the phase of the amplified signal voltage with the phase of a reference voltage which is supplied from a suitable source of 60 cycle reference voltage to its input terminals 16a and 16b. The source of reference voltage is represented by the two supply conductors 17. These conductors may be and preferably are connected to one phase of the polyphase source 12 from which the synchronous motor 11 is supplied. At the output terminals 16c and 16d of the phase discriminator unit, there is produced a direct voltage of which the polarity depends upon the phase of the amplified signal voltage relative to the reference voltage. This voltage at the output terminals of the phase discriminator unit is utilized to control a suitable reversible controlling means 18.

The main tuning capacitor 7 is increased or decreased by means of an electric motor 19 of which the energization and the direction of rotation are controlled by the reversible controlling means 18.

As shown in Fig. 2, the discriminator 16 comprises a pair of electric valves 20 and 21 which are preferably triodes. The valve 20 comprises an anode 20a, a cathode 20b and a control grid 20c. Similarly, the valve 21 has an anode 21a, a cathode 21b and a control grid 21c. These two valves may be contained in separate envelopes or, within a single envelope as illustrated in the drawing. Alternating voltage is supplied to the anode-cathode circuit of the valve 20 from the secondary winding 22b of a supply transformer 22 of which the input terminals are connected to the input terminals 16a and 16b and thus to the source of reference voltage, as explained in the foregoing. Similarly, alternating voltage is supplied to the anode-cathode circuit of the valve 21 from a different secondary winding 22c of the supply transformer. These secondary windings are poled so that a negative half cycle of alternating voltage is applied to the anode of one valve when a positive half cycle of alternating voltage is being applied to the anode of the other. A resistor 23 is connected in the output circuit of the valve 20 and a similar resistor 24 is connected in the output circuit of the valve 21. The cathode terminals 23a and 24a of these resistors are connected together.

The valves 20 and 21 are biased approximately to cut-off by means of a suitable source of biasing voltage, such as the battery 25, which is connected between the common cathode terminal of the valves and the grids 20c and 21c. Also connected in circuit between the cathode and the control grids is the secondary winding 26b of an input circuit transformer. The terminals of the primary winding 26a of this input transformer are connected to the output terminals of the amplifier 14.

When the valve 20 is conducting, a voltage drop appears across the resistor 23 of which the polarity is positive at the cathode end, as indicated by the polarity markings in the drawing. Similarly, when the valve 21 is conducting, a voltage drop appears across the resistor 24 of which the polarity is shown by the polarity markings in the drawing. The voltage which appears across either of these resistors is a rectified alternating voltage and is therefore pulsating in character. It is smoothed by means of a filter which is illustrated as comprising an inductance 27 and a capacitor 28 so that a smooth direct voltage appears across the terminals of the capacitor. When the valve 20 is conducting, the polarity of the voltage across the capacitor 28 is positive at the right-hand terminal and negative at the left-hand terminal and conversely, when the valve 21 is conducting, the voltage across the capacitor is positive at the left-hand terminal and negative at the right-hand terminal, as indicated by the polarity markings in the drawing.

The potentiometer 29 is connected across the capacitor. The slider 29a of the potentiometer provides for selecting a desired portion of the voltage across the capacitor and supplying the selected portion through the conductors 30 and 31 to the input circuit of the reversible control unit 18.

This reversible control unit is illustrated as comprising a two-stage amplifier of which the first stage comprises a pair of switching valves 32 and 33 and the second stage comprises a pair of valves 34 and 35.

Preferably the valves 32 and 33 are included within a single envelope and similarly, the valves 34 and 35 are preferably included within a single envelope. The anodes 32a and 33a of valves 32 and 33 are connected through resistors 36 and 37 to opposite terminals of a potentiometer 38 of which the slider 38a is connected to the positive terminal 39 of a source of regulated direct voltage. The cathodes 32b and 33b of the first stage valves are connected together and through an adjusting potentiometer 40 and fixed resistor 41 to the negative terminal 42 of the source of regulated voltage. A direct voltage is supplied to the supply conductors 39 and 42 by means of a biphase half wave rectifier 43 which is supplied from a suitable source of alternating voltage to which the rectifier is connected through a supply transformer 44. The rectified voltage is filtered by means of an inductance 45 and a capacitor 46 and the filtered direct voltage is supplied to the conductors 39 and 42. A pair of voltage regulating valves 47 and 48 maintain the voltages at the terminal 47a and at the conductor 39 substantially constant with respect to the voltage of the conductor 42. The conductor 31 connects the point 47a with the left-hand terminal of the output potentiometer 29 of the phase discriminator unit. The grid 33c of the first stage valve 33 is connected to the conductor 31 and the grid 32c of the first stage valve 32 is connected through the conductor 30 to the slider 29a of the potentiometer.

The voltages at the anodes 32a and 33a of the first stage valves are utilized to control the energization and direction of rotation of the motor 19 which varies the main tuning capacitor 7. As shown, the armature of the motor 19 is connected to a suitable source of alternating voltage which is represented by the supply conductors 49 and 50 through a pair of thyratrons 51 and 52 which are connected in inverse parallel relationship with each other, i. e., the anode 51a of thyratron 51 is connected to the cathode 52b of thyratron 52 and the anode 52a of thyratron 52 is connected to the cathode 51b of thyratron 51. The thyratron 51 has a control grid 51c and similarly, the thyratron 52 has a control grid 52c.

The current in the output circuit of these thyratrons is controlled by means of suitable phase-shifting circuits in the input circuits. As shown, the phase-shifting circuit of the thyratron 51 comprises a bridge network of which the opposite halves of the secondary winding 53b of a transformer 53 comprise two of the arms, and the resistor 55 and the alternating current reactance winding 54a of a saturable reactor 54 constitute the other two arms. The primary winding 53a of the transformer is connected to the alternating voltage source 49, 50. Similarly, the phase-shifting network for the thyratron 52 comprises another secondary winding 53c of the transformer, a resistor 55a and a reactance winding 56a of a saturable reactor 56. The cathode 51b of thyratron 51 is connected to the midpoint of secondary winding 53b and the grid 51c is connected through a resistor 57 and parallel capacitor 58 to the junction point of the resistor 55 and reactance winding 54a. In a similar manner, the cathode 52b of thyratron 52 is connected to the midpoint of the secondary winding 53c and its grid 52c is connected through a resistor 59 and parallel capacitor 59a to the common point of the resistor 55a and reactance winding 56a.

Thus, there is supplied between the cathode 51b and grid 51c of thyratron 51 an alternating voltage of which the phase is lagging with respect to the voltage of the anode 51a when the saturable reactor 54 is unsaturated. Similarly, when the saturable reactor 56 is unsaturated, a voltage is supplied to the grid of thyratron 52 which is lagging in phase with respect to the voltage of the anode 52a. When the phases of the grid voltages of the thyratrons are thus retarded with respect to the anode voltages, the thyratrons conduct minimum current. When the grid voltage of either thyratron is substantially in phase with its anode voltage, it conducts maximum current. For intermediate phase relationships of the grid and anode voltages of either thyratron, the current conducted by the thyratron has corresponding intermediate values.

The saturating winding 54b of saturable reactor 54 is connected in the output circuit of the second stage valve 34, and similarly, the saturating winding 56b of saturable reactor 56 is connected in the output circuit of the second stage valve 35.

A voltage divider comprising resistors 60 and 61 is connected between the anode 32a of first stage valve 32 and the negative supply conductor 42 and a similar voltage divider comprising resistors 62 and 63 is connected between the anode 33a and the negative conductor 42. The control grid 34a of valve 34 is connected to an intermediate point of the voltage divider between resistors 60 and 61 and similarly, the control grid 35a of valve 35 is connected to an intermediate point on the other voltage divider between resistors 62 and 63. The cathodes 34b and 35b of both valves are connected to the conductor 31.

Initially the potentiometer 40 is adjusted so that the currents conducted by valves 32 and 33 produce voltage drops across resistors 36 and 37 such that both second stage valves 34 and 35 are approximately at cutoff when the alternating signal voltage supplied to the input circuits of the first stage valves is zero. As a result, substantially zero current flows in the saturating windings 54b and 56b and the reactances of the A.-C. windings 54a and 56a are therefore maximum. This results in maximum retardation of the phase of the grid voltages of the thyratrons 51 and 52 with respect to the anode voltages. Consequently, the thyratrons 51 and 52 conduct substantially equal minimum amounts of current in opposite directions through the armature of the motor 19. As a result the motor has zero torque and it is at standstill. The motor 19 is provided with a field winding 19a which is excited from a rectifier illustrated as comprising a double diode electric valve which is supplied from the secondary winding 53d of transformer 53.

With the foregoing understanding of the elements and their organization, the operation will readily be understood from the following detailed description.

As the capacitor 7 is varied from minimum capacitance to maximum capacitance, the load current and therefore the direct current supplied to the oscillator first increases from a minimum to a maximum at resonance and subsequently decreases. At the maximum the first derivative of the current passes through zero. This relationship between the capacitance of capacitor 7 and the current supplied to the oscillator is represented in Fig. 3 by the curve 64 of which ordinates represent current and abscissae represent capacitance.

The alternating reference voltage which is supplied to the anode of the valve 20 of the phase discriminator unit is represented in Fig. 4 by the sinusoidal curve 65. Since the voltage which is supplied to the anode 21a of valve 21 is in phase opposition to the voltage supplied to the anode 20a, it is represented in Fig. 4 by the dotted curve 66 which is 180 degrees out of phase with the curve 65.

Figure 5:
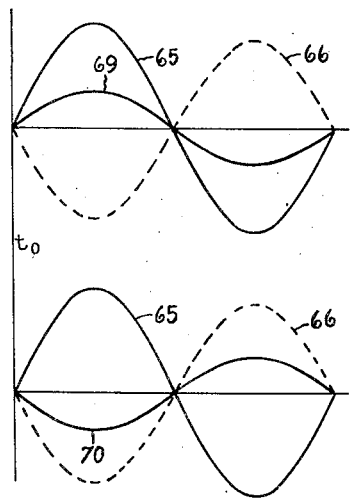

Initially the angular position of the stator of the synchronous motor 11 is adjusted so that the alternating signal voltage which appears across the resistor 13 as a result of the rotation of the short circuited coil 10 is in phase with the voltage of the anode 20a when the load circuit is tuned on the low capacitance side of resonance, for example, when the capacitance of the tuning capacitor is represented by the abscissa 67 and the direct current supplied to the oscillator is represented by the ordinate of the point 64a. During one quarter revolution of the short circuited coil 10, the current is increased from the value represented by the point 64a to the value represented by the point 64b and then decreased to the original value. During the next quarter revolution, the current is decreased from the value represented by the point 64a to the value represented by the point 64c and then increased to the original value. This produces a sinusoidal periodically and varying voltage across the resistor 13 which is in phase with the reference voltage supplied to the anode 20a, as indicated by the curve 69 which is illustrated as being in phase with the reference voltage 65 which is illustrated in Fig. 5.

Similarly, if the load circuit is tuned on the high capacitance side of resonance, for example, to a point at which the capacitance of the capacitor 7 is represented by the abscissa 68, the direct current supplied to the oscillator decreases from the value represented by the point 64d to the value represented by the point 64e during the first quarter revolution of the short circuited winding 10, and increases again to the initial value. During the second quarter revolution the current increases from the value represented by the point 64d to the value represented by the point 64f and then decreases to the original value. This produces a periodically varying signal voltage across the resistor 13 of which the phase is reversed with respect to the signal voltage that was produced when the circuit was tuned on the low capacitance side of resonance. This reverse phase signal voltage is represented by the sinusoidal curve 70 which is in phase with the voltage of the anode 21a of valve 21 of the phase discriminator.

Assuming that the load circuit is tuned on the low capacitance side of resonance, for example, at a point such that the direct current to the oscillator has the value represented by the point 64a, the periodically varying signal voltage which appears across the resistor 13 is in phase with the voltage of the anode 20a of valve 20 of the phase discriminator and is therefore in phase opposition with respect to the voltage on the anode 21a of valve 21. Consequently, the valve 20 is rendered conducting during positive half cycles of its anode voltage so that a voltage appears across the resistor 23 which is a function of the magnitude of the signal voltage. Since the signal voltage is in phase opposition with respect to the voltage of the anode 21a, the valve 21 does not become conducting at any time. Thus, a positive voltage is fed through the sensitivity potentiometer 29 to the grid 32c of the first stage amplifier valve 32.

The positive voltage on the grid 32c increases the current conducted by valve 32, thereby increasing the voltage drop across the resistors 40 and 41 with the result that the voltages at the cathodes 32b and 33b become more positive. Since the voltage of the grid 33c is maintained constant, the current conducted by valve 33 decreases as the voltage of the cathode becomes more positive. Thus, the current conducted by the valve 32 increases and the current conducted by the valve 33 decreases when a positive voltage signal is supplied to the grid 32c.

The increased current conducted by the valve 32 produces an increased voltage drop across the resistor 36 with the result that the voltage of the grid 34a of the second stage valve 34 is decreased and conversely, the decreased current conducted by the valve 33 results in a decreased voltage drop across the resistor 37 so that the voltage of the grid 35a is correspondingly increased. As a result, the current flowing in the saturating winding 54b is decreased and the current flowing in the saturating winding 56b is increased.

The decrease of current in saturating winding 54b is small since the valve 34 was substantially at cutoff before its grid voltage was decreased and consequently, the decreased saturation of the reactor 54 has very little effect on the phase of the grid voltage of thyratron 51, which as stated in the foregoing is phased substantially to cutoff. On the other hand, the increased current flowing in the saturating winding 56b decreases the reactance of the reactor 56 and correspondingly advances the phase of the grid voltage of the thyratron 52 with respect to its anode voltage. As a result, the current supplied by the thyratron 52 to the armature of the motor 19 is increased and the motor is energized for rotation in a direction to increase the capacitance of the capacitor 7, thereby adjusting the tuning of the load circuit toward resonance. As resonance is approached, the amplitude of the 60 cycle component of the signal voltage is gradually decreased and at resonance it becomes zero. This condition is illustrated in Fig. 4 in which the curve 71 represents the signal voltage at resonance. It is out of phase with the anode voltages of the valves 20 and 21 of the phase discriminator during the positive half cycle of anode voltages of each of the valves. Thus, the speed of the positioning motor decreases as resonance is approached which tends to minimize "overshooting" or "hunting."

When the load circuit is tuned to a point on the high capacitance side of resonance the phase of the periodically varying signal voltage across the resistor 13 is reversed, causing a reverse polarity voltage from the phase discriminator unit which results in advancing the phase of the grid voltage of thyratron 51 with the result that the thyratron 51 is turned on. This results in reverse rotation of the positioning motor 19 to decrease the capacitance of the main capacitor.

Figure 6:
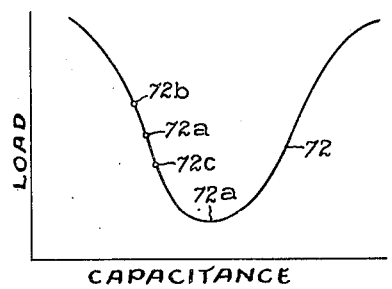

The invention may also be utilized to minimize a function which has a minimum value or a point at which its first derivative is zero or passes through zero between a range of decreasing values and a range of increasing values. Such a function is represented in Fig. 6 by the curve 72 having a point 72a at which its first derivative is zero.

To effect minimizing operation, the reversing switch 73 is operated to the reverse position. Assuming a periodic variation of the dependent function between a point 72b and a lower value 72c on opposite sides of the median value, the phase of the resulting signal voltage would be the same as that of the signal voltage produced by the variation between the values represented by the points 64f and 64e of Fig. 5, and consequently the motor 19 would rotate in the wrong direction. However, by reversing the armature connections of the motor, it will rotate in the correct direction for minimizing operation. The minimizing operation is the same as that described in the foregoing and accordingly a repetition is omitted.

Although in accordance with the provisions of the Patent Statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. A control system comprising in combination an electrical translating circuit having a variable reactance element, a source of direct voltage, an oscillator having input supply connections to said source and output connections for supplying said translating circuit, a source of periodically varying reference voltage, means for producing a periodic variation of the input current supplied to said oscillator having the same periodicity as said reference voltage, means for deriving from said periodic variation of said current a signal voltage of the same periodicity, a phase discriminator responsive to the phase relationship of said signal voltage and reference voltage, a reversible motor control system controlled by said discriminator, and a reversible motor controlled by said motor control system for varying said reactance element in an electrical direction corresponding to the phase of said signal voltage relative to said reference voltage.

2. A control system comprising in combination, an electrical translating circuit having a variable reactance element, a source of direct voltage, an oscillator having input supply connections to said source and output connections for supplying said translating circuit, a source of periodically varying reference voltage, means for producing a periodic variation of the input current supplied to said oscillator having the same periodicity as said reference voltage, means for deriving from said periodic variation of said current a signal voltage of the same periodicity, an electric valve reversible motor control system and a reversible electric motor controlled thereby for varying said reactance element, and an electric valve phase discriminator responsive to the phase relationship of said signal voltage and reference voltage for controlling said control system to cause said motor to vary said reactance in one direction when said voltages are in phase and in the opposite direction when said voltages have the opposite phase relationship, and responsive to the magnitude of said signal voltage for controlling said control system to cause said motor to vary said reactance at a rate corresponding to said magnitude.

3. A control system comprising in combination an electrical translating circuit having a variable reactance element, a source of direct voltage, an oscillator having input supply connections to said source and output connections for supplying said translating circuit, a source of periodically varying reference voltage, means for producing a periodic variation of the input current supplied to said oscillator having the same periodicity as said reference voltage, means for deriving from said periodic variation of said current a signal voltage of the same periodicty, an electric valve phase discriminator having input terminals connected to receive said signal voltage and also having output terminals, said discriminator being responsive to the phase relationship of said reference and signal voltages for producing at said output terminals a control direct voltage having a magnitude varying with the magnitude of said signal voltage and having a polarity which is reversible in response to reversal of the phase relationship of said reference and signal voltages, a reversible electric motor, and a reversible electric valve motor control system responsive to said control voltage for causing said motor to vary said reactance at a speed corresponding to the magnitude of said signal voltage and in a direction corresponding to the polarity of said control voltage.

4. A control system comprising in combination a translating circuit having an impedance of which one component is independently variable, a source of direct voltage, an oscillator having input terminals connected to said source and output connections for supplying said translating circuit, a source of periodically varying reference voltage, a synchronous motor supplied from said source of reference voltage, means driven by said motor and electrically related with said translating circuit for effecting a periodic variation of the input current supplied to said oscillator having the same periodicity as said reference voltage, means for deriving from said periodic variation of said input current a signal voltage having the same periodicity, an electric valve phase discriminator having input terminals connected to receive said signal voltage and also having output terminals, said discriminator being responsive to the phase relationship of said reference and signal voltages for producing at said output terminals a control direct voltage having a magnitude varying with the magnitude of said signal voltage and having a polarity which is reversible in response to reversal of the phase relationship of said reference and signal voltages, a reversible electric motor, and a reversible electric valve motor control system responsive to said control voltage for causing said motor to vary said impedance component at a speed corresponding to the magnitude of said signal voltage and in a direction corresponding to the polarity of said control voltage.

ORRIN W. LIVINGSTON.

REFERENCES CITED

The following references are of record in the file of this patent:

UNITED STATES PATENTS

| Number | Name | Date |
|---|---|---|
| 2,376,667 | Cunningham | May 22, 1945 |
| 2,404,568 | Dow | July 23, 1946 |
| 2,415,799 | Reifel | Feb. 11, 1947 |